(12) United States Patent
Geng et al.

(10) Patent No.: US 9,113,011 B2
(45) Date of Patent: Aug. 18, 2015

(54) METHOD AND DEVICE FOR CONTROLLING COMPOSITE SCANNING DEVICE, AND COMPOSITE SCANNING SYSTEM

(75) Inventors: Mingxia Geng, Shandong (CN); Guoqiang Wang, Shandong (CN); Yingchan Jiang, Shandong (CN); Xiangang Zhu, Shandong (CN)

(73) Assignee: SHANDONG NEW BEIYANG INFORMATION TECHNOLOGY CO., LTD, Shandong (CN)

( * ) Notice: Subject to any disclaimer, the term of this patent is extended or adjusted under 35 U.S.C. 154(b) by 33 days.

(21) Appl. No.: 14/006,251

(22) PCT Filed: Mar. 13, 2012

(86) PCT No.: PCT/CN2012/072257
§ 371 (c)(1),
(2), (4) Date: Sep. 19, 2013

(87) PCT Pub. No.: WO2012/126322
PCT Pub. Date: Sep. 27, 2012

(65) Prior Publication Data
US 2014/0009779 A1    Jan. 9, 2014

(30) Foreign Application Priority Data

Mar. 21, 2011  (CN) .......................... 2011 1 0068107

(51) Int. Cl.
*H04N 1/00* (2006.01)
(52) U.S. Cl.
CPC ....... *H04N 1/00278* (2013.01); *H04N 1/00204* (2013.01); *H04N 1/00962* (2013.01);
(Continued)

(58) Field of Classification Search
None
See application file for complete search history.

(56) References Cited

U.S. PATENT DOCUMENTS

| 6,650,432 B1 | 11/2003 | Hsu et al. |
| 2002/0063724 A1* | 5/2002 | Powers et al. ................. 345/629 |

(Continued)

FOREIGN PATENT DOCUMENTS

| CN | 101018271 | 8/2007 |
| CN | 101026670 A | 8/2007 |

(Continued)

OTHER PUBLICATIONS

PCT International Search Report in co-pending, related PCT Application No. PCT/CN2012/072257, mailed Jun. 14, 2012.

(Continued)

*Primary Examiner* — Thomas D Lee
(74) *Attorney, Agent, or Firm* — Thomas | Horstemeyer, LLP (57) ABSTRACT

The disclosure discloses a method and device for controlling a composite scanning device, and a composite scanning system. The composite scanning system includes: a composite scanning device and a host which includes: an application module configured for performing a first capability setting on the composite scanning device, obtaining the scanned image data from the composite scanning device after the first capability setting, and processing the scanned image data in a first TWAIN session state; and a configuration module configured for performing a second capability setting on the composite scanning device according to the processing result of the application module in the first TWAIN session state. By the disclosure, the efficiency of capability setting in the composite scanning system which is compatible with TWAIN protocol can be improved.

10 Claims, 6 Drawing Sheets

(52) U.S. Cl.
CPC .... *H04N1/00347* (2013.01); *H04N 2201/0074* (2013.01); *H04N 2201/0081* (2013.01); *H04N 2201/0084* (2013.01); *H04N 2201/0091* (2013.01)

(56) References Cited

U.S. PATENT DOCUMENTS

| | | | |
|---|---|---|---|
| 2003/0177448 A1* | 9/2003 | Levine et al. | 715/530 |
| 2006/0069815 A1* | 3/2006 | Warner et al. | 710/10 |
| 2007/0139683 A1 | 6/2007 | Wegeng et al. | |

FOREIGN PATENT DOCUMENTS

| | | |
|---|---|---|
| CN | 101056346 A | 10/2007 |
| CN | 101566935 A | 10/2009 |
| EP | 1734733 | 12/2006 |

OTHER PUBLICATIONS

English translation of the Abstract for CN 101018271 filed Aug. 15, 2007.

TWAIN Specification Version 2.2, dated Feb. 16, 2012 from <<TWAIN>> ,claim 1-10, p. 10, p. 33-36, p. 47-70.

* cited by examiner

Fig. 7b scanning parameter

☑ front      ☑ rear           ☑ MICR image type:      ◉ color    ◉ gray    ◉ black and white resolution:      ◉ 300     ◉ 400     ◉ 600

Fig. 8

METHOD AND DEVICE FOR CONTROLLING COMPOSITE SCANNING DEVICE, AND COMPOSITE SCANNING SYSTEM

CROSS REFERENCE TO RELATED APPLICATION

This application claims priority to PCT Application entitled "METHOD AND DEVICE FOR CONTROLLING COMPOUND SCANNING APPARATUS, AND COMPOUND SCANNING SYSTEM" having serial number PCT/CN2012/072257, filed on 13 Mar. 2012, which claims priority to and benefit of Chinese Patent Application No. 201110068107.6, filed on 21 Mar. 2011, which is incorporated by reference in its entirety.

TECHNICAL FIELD OF THE DISCLOSURE

The disclosure relates to the scanning field, and in particular to a method and device for controlling a composite scanning device, and a composite scanning system.

BACKGROUND OF THE DISCLOSURE

Technology Without An Interesting Name (TWAIN) is an international standard followed by all manufacturers of scanners, digital cameras and other devices; it provides unified regulations between software developers and hardware equipment manufacturers, and effectively avoids the problem of incompatibility between the system and the equipment; once satisfying the TWAIN requirements, an application module can obtain a static image from a peripheral device which satisfies the TWAIN; therefore, the TWAIN is widely applied in the field of scanners.

Figure 1:
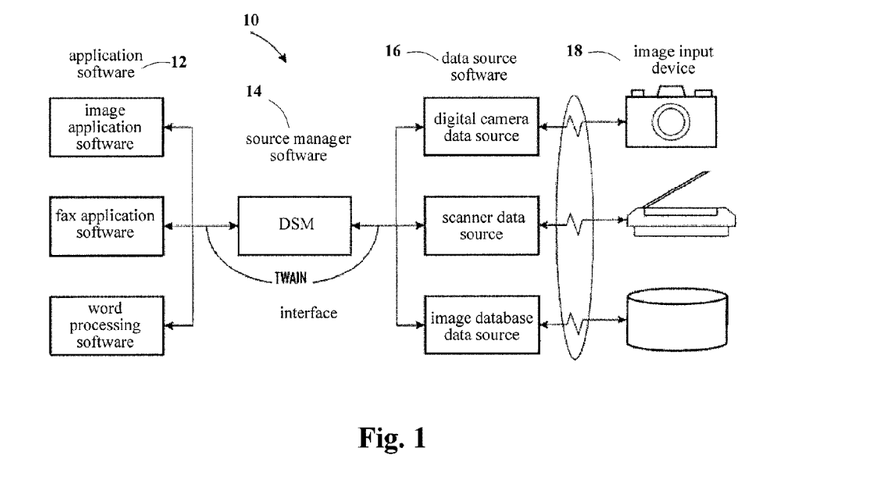
FIG. 1 shows an architecture diagram of the TWAIN in the conventional art.
Figure 2:
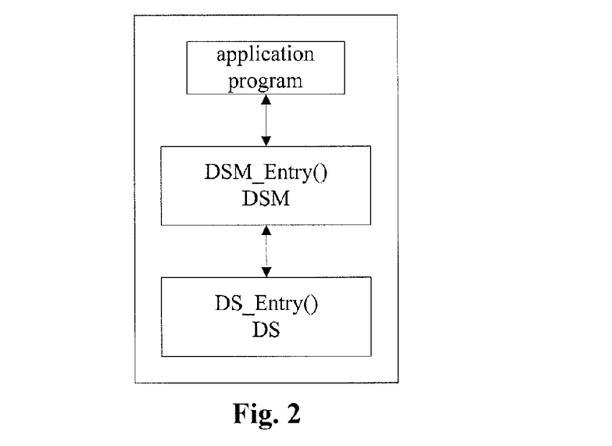
FIG. 2 shows a diagram of the communication relationship among the composition elements of the TWAIN in the conventional art.

In order to implement communication between the application module and an image acquisition device (such as a scanner), the TWAIN provides a standard software protocol and a programming interface. There are three core elements (named as elements for short) in the architecture of the TWAIN: 1) an application software: an application module which must satisfy the TWAIN, this software is generally an image processing software; 2) a Data Source (DS) software, which is used for controlling the image acquisition device, is written by the equipment developer, and follows the TWAIN requirements; 3) a data source management software: managing the communication between the application module and the DS; the relationship among the elements are shown in FIG. 1, the TWAIN 10 includes an application software 12, a Data Source Manager (DSM) software 14, a DS software 16 and an image input device 18, wherein, the application software 12 is named as an application module for short, including various application software, such as the image application software; the DSM software 14 is a DSM, named as a source manager for short; the DS software 16, named as DS or source for short, including various DSs, such as the scanner DS. From FIG. 1, it can be seen that the application software 12 cannot directly implement communication with the DS software 16; according to the TWAIN requirements, as shown in FIG. 2, the communication among the elements must be implemented via two functions, namely, DSM_Entry( ) function and DS_Entry( ) function, wherein, DSM refers to the data source manager, DS refers to the data source; the communication between the application module and the DS must be implemented via the DSM, thus realizing the data request, capability setting and the like; but the only entry between the application module and the DSM is the DSM_Entry( ) function, the only entry between the DSM and the DS is the DS_Entry( ); the communication among the elements can be implemented via the DSM_Entry( ) function and DS_Entry( ) function; each communication operation is initiated by the application module or the DSM, and is implemented via triples which are composed of three different parameters; the three composition parameters of the triples are respectively a Data Group (DG_xxxx), a Data Argument Type (DAT_xxxx) and a Message ID (MSG_xxxx); each of the triples uniquely determines one specific operation. Wherein, the operations are divided into two categories via the DG, which are the control operation and the image operation; the control operation is to control the TWAIN session, and is implemented by the Control Data Group (DG_CONTROL); the image operation is relative to the image data, and is implemented by an Image Data Group (DG_IMAGE).

In order to acquire the data, the application module, the DSM and the DS must implement communication to each other, and the process of acquiring the data must be implemented according to a certain sequence. The TWAIN defines seven states of the TWAIN session to guarantee the implementation according to a correct sequence, which can refer to the state transition diagram shown in FIG. 3. A session not only can be a process that the application module is connected to the DS via the DSM, but also can be a process that the application module is connected to the DSM. In a certain time point of the session, the DSM and the DS respectively have different states, a certain request sent from the application module or the DS may cause state transition; the state transition can be forward or backward. Most of the state transitions are single-state transitions, and also can be multi-state transitions.

Figure 3:
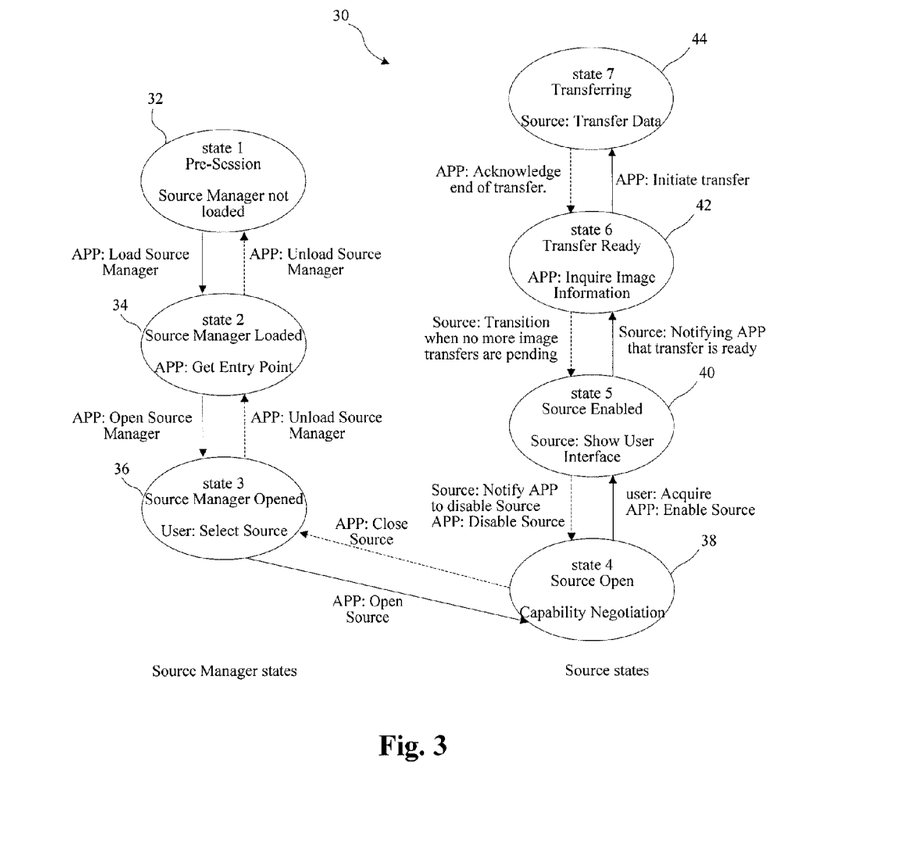
FIG. 3 shows a diagram of state transitions among the composition elements of the TWAIN in the conventional art.

As shown in FIG. 3, the brief descriptions of the seven states are as follows: state 1, the source manager is not loaded; state 2, the source manager has been loaded; state 3, the source manager has been opened; state 4, the source has been opened, and is capable of implementing capability query and capability setting, such as the capability setting of resolutions, image types, scanning areas and the like; state 5, displaying the user interface; state 6, the transmission is ready; state 7, implementing image transmission. It should note that, the states 1, 2, 3 are occupied by the DSM, the states 4, 5, 6, 7 are occupied by the DS. If one DS is closed, namely, the user interface of an image input device in the application module is closed, the DS corresponding to the image input device has no state.

The states of the DSM and the DS are changed according to the following sequences during the process of acquiring the data. First, after loading the source manager, the DSM enters the state 2 from the state 1; after the DSM enters the state 2, the DSM enters the state 3 from the state 2 after opening the source manager; via opening the source, the DS enters the state 4; and the DS enters the state 5 from the state 4 by enabling the source; the DS enters the state 6 from the state 5 by notifying the application module that the transfer is ready; by requesting the image transmission via the application module, the DS enters the state 7 from the state 6, and transmits the image to the application module. When implementing data transmission, the DS occupies the state 7; when waiting for the scanning data of the scanning device during the data transmission process, the DS occupies the state 6; when the application module cancels the image transmission during the data transmission process, the DS moves from the state 7 to the state 5; when the image transmission ends, the DS moves from the state 6 to the state 5.

Only a determined operation can be implemented in a given state, furthermore, any given operation only can be implemented in the given state. For example, the capability setting only can be implemented in the state 4, the transmission of the scanning image only can be implemented in the state 7. When the DS is the scanner, the setting of capability relative to the scanner (named as the scanning capability for short) is implemented in the state 4, for example, setting the image types, resolutions, image size and the like; when the DS is the composite scanning device (such as a scanning and printing integrated machine), the setting of scanning capability and other capabilities can be implemented in the state 4, for example, defining the print content via the printing capability setting, no matter how the processing result of the scanning image is, the composite scanning device can print the print content. However, in the actual application of the composite scanning device, the printing capability setting needs to be implemented after processing the scanning image, so as to determine whether implementing printing, and to determine the print content, the print position and the like according to the image processing result; thus, the printing capability setting cannot be implemented in advance, and only can be implemented after processing the scanning image. However, according to the TWAIN requirements, the capability setting only can be implemented in the case that the DS returns to the state 4 from the state 7 of the transmission image after the application module processes the scanning image, such operation may cause this scanning operation to end; the user must implement the interface operation again to implement the printing capability setting, which causes low working efficiency and inconvenient use.

SUMMARY OF THE DISCLOSURE

The disclosure is provided aiming at the problem that the composite scanning system in the conventional art can only implement the determined operation in a given state, which causes low capability setting efficiency; for this reason, the main purpose of the disclosure is to provide a method and device for controlling a composite scanning device, and a composite scanning system, so as to solve the above problem.

In order to realize the above purpose, a composite scanning system is provided according to one aspect of the disclosure, the composite scanning system comprises a composite scanning device and a host, wherein, the host comprises: an application module, configured for performing a first capability setting on the composite scanning device, obtaining the scanning image data of the composite scanning device after the first capability setting, and processing the scanning image data in a first TWAIN session state; a configuration module, configured for performing a second capability setting for the composite scanning device according to the processing result of the application module in the first TWAIN session state; a DS, configured for transferring the capability value set by the application module or the capability value obtained from the configuration module to the composite scanning device, and transferring the scanning image data of the composite scanning device to the application module; and a DSM, configured for managing the communication between the application module and the DS.

Further, the application module is used for judging whether the medium satisfies the preset requirements; and the configuration module is used for setting the value of the second capability setting according to the judgment result, wherein, when the medium satisfies the preset requirements, setting the value of the second capability setting to be the first capability value; when the medium does not satisfy the preset requirements, setting the value of the second capability setting to be the second capability value.

Further, the second capability setting comprises the printing capability setting and/or the scanning capability setting.

Further, the first TWAIN session state is the Transfer Ready state.

Further, the first capability setting comprises the scanning capability setting and the recognizing capability setting.

In order to achieve the above purpose, a method for controlling a composite scanning device is provided according to another aspect of the disclosure. The method for controlling the composite scanning device comprises: using the application module to perform the first capability setting on the composite scanning device; using the application module to obtain the scanning image data of the composite scanning device after the first capability setting; using the application module to process the scanning image data in the first TWAIN session state; and using the configuration module to perform the second capability setting on the composite scanning device according to the processing result of the application module in the first TWAIN session state.

Further, the step of using the application module to process the scanning image data in the first TWAIN session state comprises: judging whether a medium satisfies the preset requirements, the step of using the configuration module to perform the second capability setting on the composite scanning device according to the processing result of the application module in the first TWAIN session state comprises: when the medium satisfies the preset requirements, the configuration module sets the value of the second capability setting as the first capability value; and when the medium does not satisfy the preset requirements, the configuration module sets the value of the second capability setting as the second capability value.

Further, the second capability setting comprises the printing capability setting and/or the scanning capability setting.

Further, the first TWAIN session state is the Transfer Ready state.

In order to achieve the above purpose, a device for controlling the composite scanning device is provided according to another aspect of the disclosure. The device for controlling the composite scanning device comprises: an application module, configured for performing the first capability setting on the composite scanning device, obtaining the scanning image data of the composite scanning device after the first capability setting, and processing the scanning image data in the first TWAIN session state; a configuration module, configured for performing the second capability setting on the composite scanning device according to the processing result of the application module in the first TWAIN session state; a DS, configured for transferring the capability value set by the application module or the capability value obtained from the configuration module to the composite scanning device, and transferring the scanning image data of the composite scanning device to the application module; and a DSM, configured for managing the communication between the application module and the DS.

Further, the application module is used for judging whether the medium satisfies the preset requirements; and the configuration module is used for setting the value of the second capability setting to be the first capability value when the medium satisfies the preset requirements, and setting the value of the second capability setting to be the second capability value when the medium does not satisfy the preset requirements.

Further, the application module is also used for obtaining the recognizing data of the composite scanning device after the first capability setting, and processing the recognizing data in the first TWAIN session state.

Further, the first capability setting comprises the scanning capability setting and the recognizing capability setting.

According to the disclosure, the composite scanning system comprising the following parts is adopted: the composite scanning device and the host, wherein, the host comprises: an application module, configured for performing a first capability setting on the composite scanning device, obtaining the scanning image data of the composite scanning device after the first capability setting, and processing the scanning image data in a first TWAIN session state; a configuration module, configured for performing a second capability setting for the composite scanning device according to the processing result of the application module in the first TWAIN session state; as the configuration module is capable of automatically performing the next capability setting on the composite scanning system according to the processing result of the application module, the problem that the composite scanning system in the conventional art only can implement determined operation in a given state, thus causing low capability setting efficiency is solved, and the effect of improving the capability setting efficiency in the composite scanning system which is compatible with the TWAIN protocol can be further realized.

BRIEF DESCRIPTION OF THE DRAWINGS

The drawings for forming a part of the application are used for further understanding the disclosure, the exemplary embodiments of the disclosure and the specifications thereof are used for explaining the disclosure, without improperly limiting the disclosure. In the drawings.

DETAILED DESCRIPTION OF THE DISCLOSURE

It should note that, the embodiments of the application and the characteristics of the embodiments can be mutually combined in the case of no conflict. The disclosure is described below in details with reference to the drawings and embodiments.

Figure 4:
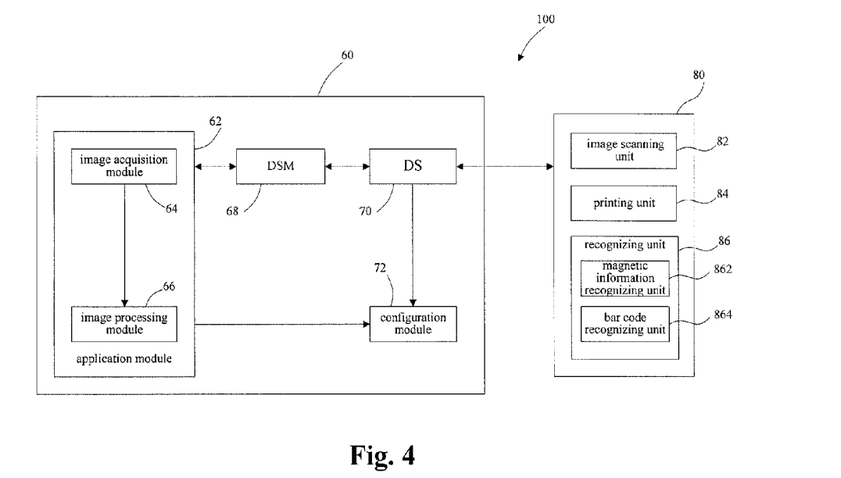
FIG. 4 shows a composition diagram of a composite scanning system according to an embodiment of the disclosure.

FIG. 4 shows a composition diagram of a composite scanning system according to an embodiment of the disclosure.

As shown in FIG. 4, the composite scanning system includes: a composite scanning device 80 and a host 60.

The host 60 includes: an application module 62, for performing a first capability setting on the composite scanning device 80, obtaining the scanning image data of the composite scanning device 80 after the first capability setting, and processing the scanning image data in a first TWAIN session state; a configuration module 72, for performing a second capability setting for the composite scanning device 80 according to the processing result of the application module 62 in the first TWAIN session state; a DS 70, for transferring the capability value set by the application module 62 or the capability value obtained from the configuration module 72 to the composite scanning device 80, and transferring the scanning image data of the composite scanning device 80 to the application module 62; and a DSM 68, for managing the communication between the application module 62 and the DS 70.

In the above composite scanning system, as the configuration module is capable of automatically implementing the next capability setting for the composite scanning system according to the processing result of the application module, the capability setting efficiency in the composite scanning system which is compatible with the TWAIN protocol can be improved.

Preferably, the application module 62 is used for judging whether the medium satisfies the preset requirements, wherein, the configuration module 72 is used for performing the second capability setting on the composite scanning device 80 according to the judgment result. And now, the composite scanning system is capable of automatically performing the next capability setting on the composite scanning system according to the processing result of the application module, thus improving the capability setting efficiency.

Preferably, the second capability setting includes the printing capability setting and/or the scanning capability setting. And now, the efficiency of the printing capability setting and/or scanning capability setting of the composite scanning system can be improved.

Preferably, the first TWAIN session state is the Transfer Ready state. As the application module and the configuration module respectively implement two different capability settings, and the configuration module is capable of automatically performing the next capability setting on the composite scanning system according to the processing result of the application module, the capability setting can be implemented via the composite scanning system in the Transfer Ready state, thus improving the capability setting efficiency of the composite scanning system.

The preferred embodiment of the composite scanning system of the disclosure is described below with reference to FIG. 4, as shown in FIG. 4, the composite scanning system 100 includes a host 60 and a composite scanning device 80, wherein, the host 60 includes an application module 62, a DSM 68, a DS 70 and a configuration module 72. The application module 62 is an image processing module which satisfies the TWAIN requirements, and is used for performing the first capability setting on the composite scanning device, obtaining the scanning image, processing the scanning image, and the like; the DSM 68 is used for managing the communication between the application module 62 and the DS 70; the DS 70 is used for transferring the capability value set by the application module or the capability value obtained from the configuration module 72 to the composite scanning device 80, transferring the scanning image data of the composite scanning device 80 to the application module, and the like; the configuration module 72 is used for performing the second capability setting on the composite scanning device according to the image processing result of the application module 62, for example, whether the scanning medium satisfies the requirements, and the like, wherein, the second capability setting includes the printing capability setting and the second scanning capability setting. The printing capability setting includes the setting of the printing capability value such as the print content, the character size, the print position, the print density and the like; the second canning capability setting includes the setting of the scanning capability value such as the image types, the image resolutions and the like. The value of the second capability setting can be stored in a certain file of a hard disk, for example, stored in a configuration file (config.ini) or a registry.

The composite scanning device 80 includes an image scanning unit 82, a printing unit 84 and a recognizing unit 86, wherein, the image scanning unit 82 scans the medium according to the scanning capability value, such as the resolution and image type, and transmits the scanning image data to the host 60; the printing unit 84 prints the print content on the medium according to the printing capability value, such as the print position and print density; the printing type can be inkjet printing, stylus printing or thermal printing. The recognizing unit 86 includes one or two of the magnetic information recognizing unit 862 and the bar code recognizing unit 864, wherein, the magnetic information recognizing unit 862 is used for recognizing the magnetic information on the medium, for example, recognizing the Magnetic Ink Character Recognition (MICR) characters, recognizing the F2F coded characters, and the like; the bar code recognizing unit 864 is used for recognizing the bar codes on the medium, for example, recognizing various one-dimensional bar codes, recognizing various two-dimensional bar codes and the like.

The application module 62 includes an image acquisition module 64 and an image processing module 66. The image acquisition module 64 is used for establishing a session, for example, opening the composite scanning device, implementing the first capability setting for the composite canning device, including the first scanning capability setting and the recognizing capability setting, such as the setting of the image types and image resolutions in the first scanning, and the setting of the recognizing data types in the recognizing capability; the image acquisition module 64 is also used for connecting the DS, receiving the scanning image, receiving the recognizing data, and the like. The composite scanning device scans the medium according to the scanning capability of the first scanning capability setting, transmits the scanning image of the medium, and reads the bar code information or the recording information on the medium according to the recognizing data types of the recognizing capability setting, for example, reading the MICR characters on the medium, and transferring the recognizing data; the image processing module 66 is used for processing the scanning image obtained by the image acquisition module 64, determining whether the scanned medium satisfies the requirements. The image processing generally includes implementing Optical Character Recognition (OCR) for the characters on the scanning medium, for example, identifying the personal signature and check amount of the check, and implementing comprehensive judgment for the OCR identification result and the acquired recognizing data, for example, jointly determining the authenticity of the check according to the personal signature and check amount acquired via the OCR identification and the bank number and check number which are recorded via the MICR characters acquired by the recognizing unit, storing the scanning information of the true check, and archiving the electronic check.

The host 60 is also named as the control device of the composite scanning device, so the embodiment of the disclosure also provides a device for controlling the composite scanning device; this control device can be the host 60 provided by any embodiment of the disclosure. The device for controlling the composite scanning device includes: an application module, for performing a first capability setting on the composite scanning device, obtaining the scanning image data of the composite scanning device after the first capability setting, and processing the scanning image data in a first TWAIN session state; a configuration module, for performing a second capability setting for the composite scanning device according to the processing result of the application module in the first TWAIN session state; a DS, for transferring the capability value set by the application module or the capability value obtained from the configuration module to the composite scanning device, and transferring the scanning image data of the composite scanning device to the application module; and a DSM, for managing the communication between the application module and the DS.

Preferably, the application module is used for judging whether the medium satisfies the preset requirements; and the configuration module is used for setting the value of the second capability setting to be the first capability value when the medium satisfies the preset requirements, and setting the value of the second capability setting to be the second capability value when the medium does not satisfy the preset requirements.

Further, the application module is also used for obtaining the recognizing data of the composite scanning device after the first capability setting, and processing the recognizing data in the first TWAIN session state.

It should note that, the composite scanning system provided by the disclosure may include the composite scanning device provided by any embodiment of the disclosure.

Figure 5:
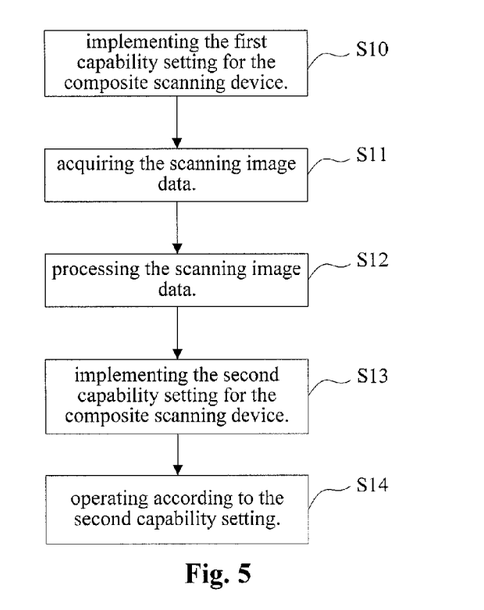
FIG. 5 shows a flowchart of a method for controlling the composite scanning device according to the embodiment of the disclosure.
Figure 8:
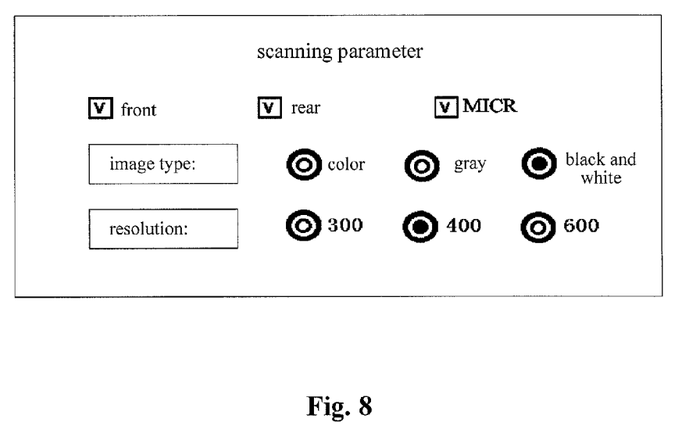
FIG. 8 shows an interface diagram of the first scanning capability setting according to the embodiment of the disclosure.

FIG. 5 shows a flowchart of a method for controlling the composite scanning device according to the embodiment of the disclosure; the specific processing procedure is as follows:

Step S10, Performing the First Capability Setting on the Composite Scanning Device In the state 4, the image acquisition module 64 performs the first capability setting on the composite scanning devices via the triples DG_CONTROL/DAT_CAPABILITY/MSG_SET; the menu of the first capability setting is shown in FIG. 8, including front, rear and MICR options which can check, wherein, front refers to scanning the front of the medium, rear refers to scanning the rear of the medium, MICR represents that the composite scanning device recognizes the MICR characters on the medium during the medium scanning process; the scanning parameter selection includes selection of the image types and selection of the image resolutions, wherein, the image types include color images, gray images, black and white images; the image resolutions include 300 Dots Per Inch (DPI), 400 DPI and 600 DPI.

Step S11, Acquiring the Scanning Image Data

Figure 7A:
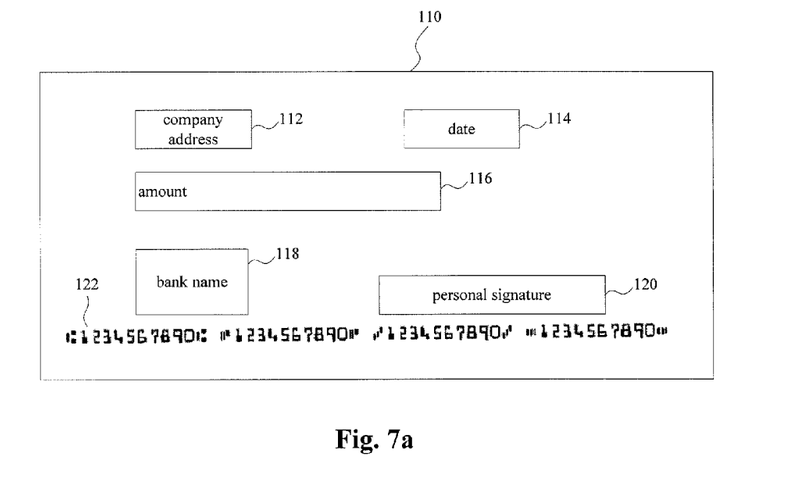
FIG. 7a shows a front diagram of a check.

After performing the first capability setting, the composite scanning device scans the medium according to the value of the first capability setting, and obtains the scanning image data. In the state 6, the application module requests data transmission; in the state 7, the application module receives the scanning image data of the composite scanning device. Preferably, this step also can include: acquiring the recognizing data, when the scanning medium is the check shown in FIG. 7*a*, and the MICR is selected in the first capability setting, the magnetic information recognizing unit 862 of the composite scanning device recognizes the MICR characters 122 on the check 110, the output result, namely, the MICR character string, is generally recognizing data; the MICR character records the bank number and check number of the check.

Step S12, Processing the Scanning Image Data

In the state 6, the image processing module 66 processes the acquired scanning image data, wherein the processing of the scanning image data includes the OCR identification for the characters on the medium, and then compares with the preset data according to the OCR identification data, so as to determine whether the scanning medium satisfies the requirements. The specific processing of the scanning image data is described by taking the scanning medium to be the supermarket coupons as an example. The image processing module 66 implements OCR identification for the issuer, amounts, numbers and valid date on the coupons to be scanned, compares with the preset issuer, amounts, numbers and valid date according to the issuer, amounts, numbers and valid date acquired via the OCR identification, so as to determine whether the coupons satisfy the requirements, for example, whether the coupons exist, whether the date is invalid, whether the amount of the coupons is correct, and the like; if the coupons exist, the date is valid, and the amount is correct, the coupons satisfy the requirements; otherwise, the coupons may be altered, counterfeit or invalid, namely, the coupons cannot satisfy the requirements.

In the case that Step S11 also includes acquiring the recognizing data, this step includes: processing the scanning image data and the recognizing data. In the state 6, the image processing module 66 processes the scanning image data, wherein the processing of the scanning image data includes: implementing OCR identification for the characters on the medium, and then, compares with the preset data according to the OCR identification data and the recognizing data of the composite scanning device, to determine whether the medium satisfies the requirements. The specific processing of the scanning image data and the recognizing data is described by taking the scanning medium to be the check as an example; the image processing module 66 implements OCR identification for the personal signature, check amount, date of issue and the like on the scanning check, and compares with the owner of the check, the check amount, the check number and the bank number which are preset according to the personal signature, check amount and the date of issue obtained via the OCR identification and the bank number and check number which are recorded by the MICR characters obtained via the recognizing unit, so as to determine whether the check satisfies the requirements, for example, whether the date of issue of the check is invalid, whether the drawer overdraws, whether the drawer owns the check of the bank corresponding to the bank number; when the drawer of the scanning check owns the check with the bank number, the date of the check is valid, and the check is not overdrawn, this check is valid, namely, this check satisfies the requirements; otherwise, this check is invalid, namely, this check does not satisfy the requirements.

Figure 6:
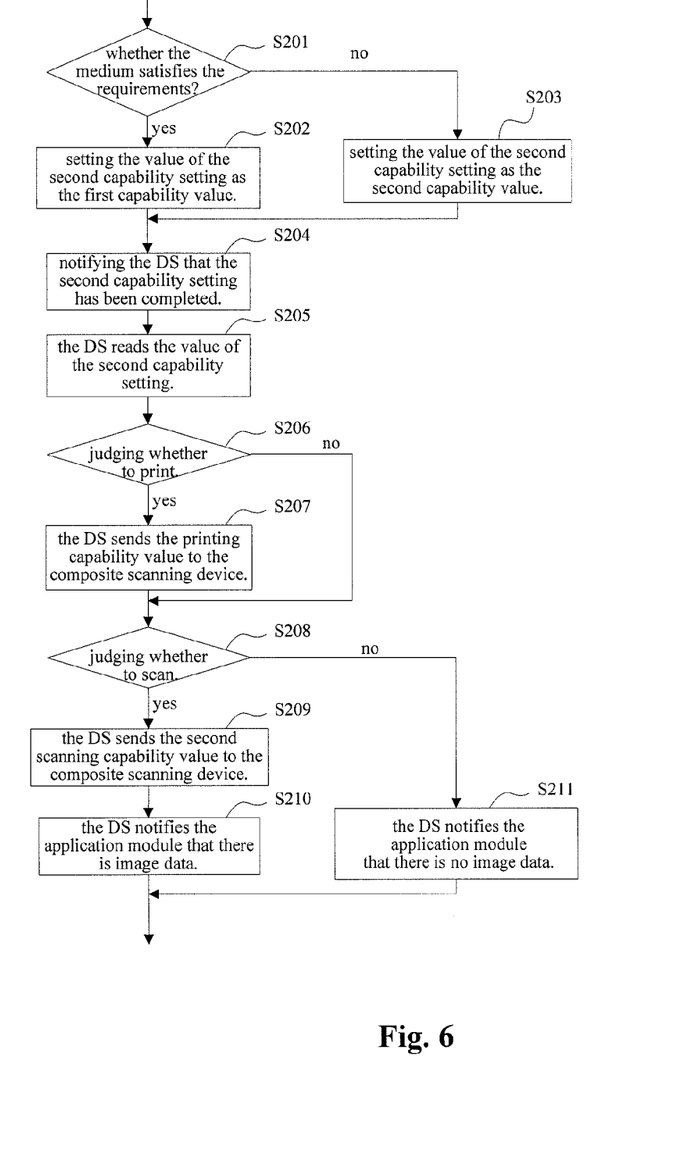
FIG. 6 shows a flowchart of a method for setting capability of the composite scanning device according to the embodiment of the disclosure.

Step S13, Performing the Second Capability Setting on the Composite Scanning Device In the state 6, the capability setting for the next operation of the composite scanning device is implemented according to the processing result of the scanning image data implemented by the image processing module 66, namely, the second capability setting, including the setting of the printing capability and the setting of the second scanning capability. The specific setting is shown in the flowchart of FIG. 6. Wherein, in the case that the processing result of the scanning image data implemented by the image processing module 66 needs to be printed, the second capability setting can be only setting the printing capability, or in the case that the processing result of the scanning image data implemented by the image processing module 66 needs to be scanned, the second capability setting also can be only setting the second scanning capability.

The Step S13 can also include the following steps: the configuration module 72 sets the value of the second capability setting; after the configuration module 72 completes setting the value of the second capability setting, the application module 62 notifies the DS to read the value of the second capability setting set by the configuration module 72; and the DS sends the read data to the composite scanning device. Meanwhile, in the composite scanning system, the second capability setting for the composite scanning device is jointly implemented by the configuration module 72 and the application module 62.

Step S14, Implementing Operation According to the Second Capability Setting

If the printing capability set in the second capability setting is printing, the composite scanning device prints the characters set in the printing capability value; if the scanning capability set in the second capability setting is scanning, the composite scanning device scans the medium, and transmits the scanning image data to the application module via the DS.

FIG. 6 shows a flowchart of a method for setting capability of the composite scanning device according to the embodiment of the disclosure, the specific setting steps are as follows:

Step S201, Judging Whether the Medium Satisfies the Requirements

Determining the processing result of the scanning image data, namely, whether the scanning medium satisfies the requirements; if yes, implementing Step S202; otherwise, implementing Step S203.

Step S202, Setting the Value of the Second Capability Setting as the First Capability Value When the processing result of the scanning image data is that the medium satisfies the requirements, the configuration module 72 sets the value of the second capability setting to be the first capability value. The printing capability value in the first capability value defines the parameters such as the print content, the print position and the print density; the scanning capability value in the first capability value defines the parameters such as image types and image resolutions of the second scanning. The configuration module 72 implements the setting of the first capability value by modifying the Config.ini file or modifying the computer registry, or by operating a certain software. The printing capability value includes the parameters such as NeedPrint, PrintText, LeadingEdge, Position, FontType, FontHeight, LogoName and Density. Wherein, NeedPrint is used for setting whether printing, for example, when NeedPrint is equal to 1, it represents printing; when NeedPrint is equal to 0, it represents not printing; PrintText is used for setting the print type, for example, when PrintText is equal to 1, printing the characters, when PrintText is equal to 0, printing logo; LeadingEdge is used for setting the relative position of the print area, for example, when LeadingEdge is equal to 0, the print area is relative to the front edge of the medium, when LeadingEdge is equal to 1, the print area is relative to the rear edge of the medium; Position is used for defining the distance of the print area relative to the edge; FontType is used for defining the font of the print characters; FontHeight is used for defining the height of the print characters; Line1, Line2, Line3 are respectively used for defining the first line, the second line and the third line of characters; LogoName is used for defining the name of the logo files; Density is used for defining the gray level of the logo. The scanning capability value of the second scanning includes: 1) implementing the second scanning (Need- Scan=1); 2) front scanning (Front=1), rear scanning (Rear=1); 3) parameters relative to the image, such as image types (ImageType=Gray, gray image), image resolutions (Dpi=300), image sizes (ImageSize=200*200). When the scanned medium satisfies the requirements, the detailed setting of each parameter of the first capability value is shown in the capability setting table of FIG. 1.

TABLE 1

| Information processing result | Capability value setting | | Value description |
|---|---|---|---|
| Satisfying the requirements | Printing capability value | NeedPrint = 1 | Need print: yes |
| | | PrintText = 1 | Printing text: yes |
| | | FontType = Arial | Font type: Arial |
| | | FontHeight = 65 | Font height: 65 |
| | | Line1 = electronically presented | The first line of content: processing result |
| | | Line2 = 2011 Jan. 16 | The second line of content: date |
| | | Line3 = XXX bank | The third line of content: officer |
| | | LogoName = image.bmp | Name of Logo |
| | | Density = 2 | Print density: 2 |
| | | LeadingEdge = 0 | The print position is located from the front |
| | | Position = 80 | Print position: 80 |
| | Scanning capability value | NeedScan = 1 | Need scan: yes |
| | | Front = 0 | Front scanning: no |
| | | Rear = 1 | Rear scanning: yes |
| | | ImageType = Gray | Image type: gray |
| | | Dpi = 300 | Image resolution: 300 dpi |
| | | ImageSize = 200*200 | Image size: 200*200 |

Step S203, Setting the Value of the Second Capability Setting as the Second Capability Value When the processing result of the scanning data is that the medium does not satisfy the requirements, the configuration module 72 sets the value of the second capability setting as the second capability value, the printing capability value and the scanning capability value in the second capability value respectively indicate that the composite scanning device does not implement printing or does not implement the second canning. The setting of the main parameters of the second capability value are as shown in the capability setting table of FIG. 2, wherein, the printing parameter NeedPrint of the printing capability value is equal to 0, the scanning parameter NeedScan of the scanning capability value is equal to 0.

TABLE 2

| Information processing result | Capability value setting | | Value description |
|---|---|---|---|
| Not satisfying the requirements | Printing capability value | NeedPrint = 0 | Need print: no |
| | | ... | ... |
| | Scanning capability value | NeedScan = 0 | Need scan: no |
| | | ... | ... |

Step S204, Notifying the DS that the Second Capability Value has Been Completed

After the configuration module 72 completes the first capability value or the second capability value, the image acquisition module 64 of the application module 62 invokes the function DSM( ), and notifies the DS to inquiry the remained image pages via the triples DG_CONTROL/DAT_PENDINGXFERS/MSG_ENDXFER, namely, the application module has completed the printing capability value and the second scanning capability value.

Step S205, the DS Reads the Second Capability Value

The DS 70 acquires the second capability value from the configuration module 72, including the printing capability value and the scanning capability value, wherein, if the parameter NeedPrint is equal to 1, it represents needing to print, then reading the character printing information, the logo printing information and the like; if the parameter NeedPrint is equal to 0, it represents not print; if the parameter NeedScan is equal to 1, it represents needing to implement the second scanning, then reading the capability value of the second canning; if the parameter NeedScan is equal to 0, it represents not needing to implement the second scanning.

Step S206, Judging Whether Printing

The DS judges whether printing according to whether the parameter NeedPrint in the printing capability value is equal to 1. If NeedPrint is equal to 1, it represents implementing printing, and then implementing Step S207; otherwise, implementing Step S208.

Figure 7B:
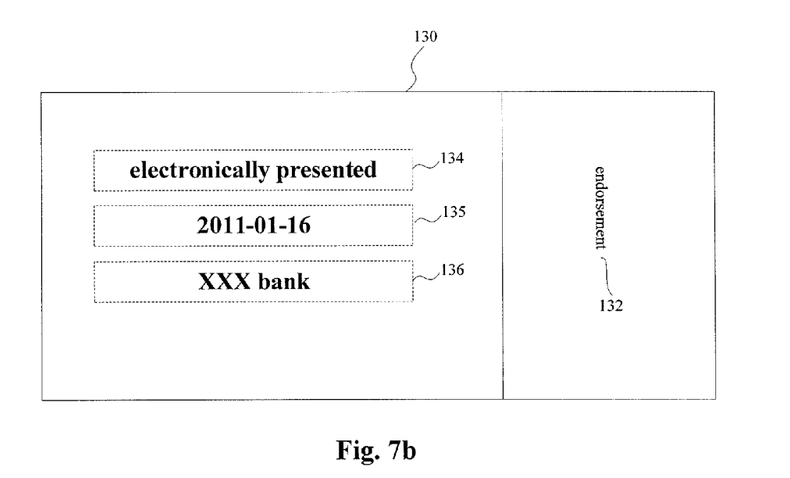
FIG. 7b shows a rear diagram of a check processed by the composite scanning device of the disclosure.

Step S207, the DS Sends the Printing Capability Value to the Composite Scanning Device The DS sends the printing capability value to the composite scanning device, after receiving the printing capability value, the composite scanning device implements printing for the characters defined by the parameter Line1 and the like, and the logo defined by the LogoName in the print areas assigned by the parameter LeadingEdge and Position. The printing effect of the medium is as shown in FIG. 7b, the first line of value defined by the parameter Line1 in the printing capability value of table 1 is corresponding to the value 134 in FIG. 7b, the second line of value defined by the parameter Line2 is the value 135 in FIG. 7b, and the third line of data defined by the parameter Line3 is the value 136 in the FIG. 7b, the print position is opposite to the front edge of the check.

Step S208, Judging Whether Scanning

The DS judges whether needing to implement the second scanning according to whether the parameter NeedScan of the scanning capability value is equal to 1, if NeedScan is equal to 1, it represents implementing the second scanning, and then implementing Step S209; otherwise, implementing Step S211.

Step S209, the DS Sends the Second Scanning Capability Value to the Composite Scanning Device The DS sends the second scanning capability value to the composite scanning device, the composite scanning device implements the second scanning for the medium according to the received scanning capability value.

Step S210, the DS Notifies the Application Module that there is Image Data

After the composite scanning device implements the second canning for the medium, the DS responds to the DSM( ) function call of which the triples are DG_CONTROL/DAT_PENDINGXFERS/MSG_ENDXFER, and represents that there is image data via (pPendingXfers→Count !=0).

Step S211, the DS Notifies the Application Module that there is No Image Data

When not needing to implement the second canning, the DS responds to the DSM( ) function call of which the triples are DG_CONTROL/DAT_PENDINGXFERS/MSG_ENDXFER, and represents that there is no image data via (pPendingXfers→Count=0).

The capability setting during the data transmission process in the composite scanning system which is compatible with the TWAIN protocol can be achieved via the method that the configuration module sets the printing capability value and the scanning capability value of the composite scanning device according to the scanning image processing result of the application module, and the DS reads the capability value set in the configuration module; the disadvantage that the TWAIN protocol can only implement capability setting in the state 4 is overcome, the application range of the TWAIN protocol can be enlarged; not only the complex control to the composite scanning device can be realized, but also the scanning, printing and re-scanning operations for the medium can be realized once the user of the application module opens the user interface, thus obtaining simple operation and high working efficiency.

The above is only the preferred embodiment of the disclosure and not intended to limit the invention, and for those skilled in the art, the invention can have various modifications and changes. Any modifications, equivalent replacements, improvements and the like within the spirit and principle of the invention shall fall within the scope of protection of the invention.

The invention claimed is:

1. A composite scanning system, comprising a composite scanning device (80) and a host (60), wherein the host (60) comprises:
an application module (62), configured for performing a first capability setting on the composite scanning device (80), obtaining scanning image data of the composite scanning device (80) after the first capability setting, and processing the scanning image data in a first TWAIN session state, wherein the first TWAIN session state is Transfer Ready state;
a configuration module (72), configured for performing a second capability setting for the composite scanning device (80) according to the processing result of the application module (62) in the first TWAIN session state;
a Data Source (70), configured for transferring capability value set by the application module (62) or capability value obtained from the configuration module (72) to the composite scanning device (80), and transferring the scanning image data of the composite scanning device (80) to the application module (62); and
a Data Source Manager (68), configured for managing the communication between the application module (62) and the Data Source (70).

2. The composite scanning system according to claim 1, wherein the second capability setting comprises printing capability setting and/or scanning capability setting.

3. The composite scanning system according to claim 1, wherein, the first capability setting comprises scanning capability setting and recognizing capability setting.

4. A method for controlling the composite scanning device, comprising:
using an application module to perform a first capability setting on the composite scanning device;
using the application module to obtain scanning image data of the composite scanning device after the first capability setting;
using the application module to process the scanning image data in a first TWAIN session state, wherein the first TWAIN session state is Transfer Ready state; and
using a configuration module to perform a second capability setting on the composite scanning device according to the processing result of the application module in the first TWAIN session state.

5. The method for controlling the composite scanning device according to claim 4, wherein,
the step of using the application module to process the scanning image data in the first TWAIN session state comprises: judging whether a medium satisfies preset requirements,
the step of using the configuration module to perform the second capability setting on the composite scanning device according to the processing result of the application module in the first TWAIN session state comprises: when the medium satisfies the preset requirements, the configuration module sets the value of the second capability setting as a first capability value; and when the medium does not satisfy the preset requirements, the configuration module sets the value of the second capability setting as a second capability value.

6. The method for controlling the composite scanning device according to claim 4, wherein, the step of using the configuration module to perform the second capability setting on the composite scanning device according to the processing result of the application module in the first TWAIN session state comprises:
the configuration module setting the value of the second capability setting;
after the configuration module completes setting the value of the second capability setting, the application module notifying a Data Source to read the value of the second capability setting set by the configuration module; and
the Data Source sending the read data to the composite scanning device.

7. A device for controlling a composite scanning device, comprising:
an application module (62), configured for performing a first capability setting on the composite scanning device (80), obtaining the scanning image data of the composite scanning device (80) after the first capability setting, and processing the scanning image data in a first TWAIN session state, wherein the first TWAIN session state is Transfer Ready state;
a configuration module (72), configured for performing a second capability setting on the composite scanning device (80) according to the processing result of the application module (62) in the first TWAIN session state;
a Data Source (70), configured for transferring the capability value set by the application module (62) or the capability value obtained from the configuration module (72) to the composite scanning device (80), and transferring the scanning image data of the composite scanning device (80) to the application module (62); and
a Data Source Manager (68), configured for managing the communication between the application module (62) and the Data Source (70).

8. The device for controlling the composite scanning device according to claim 7, wherein,
the application module (62) is configured for judging whether a medium satisfies the preset requirements; and
the configuration module (72) is configured for setting the value of the second capability setting to be the first capability value when the medium satisfies the preset requirements, and setting the value of the second capability setting to be the second capability value when the medium does not satisfy the preset requirements.

9. The device for controlling the composite scanning device according to claim 7, wherein, the application module (62) is also configured for obtaining a recognizing data of the composite scanning device (80) after the first capability setting, and processing the recognizing data in the first TWAIN session state.

10. The device for controlling the composite scanning device according to claim 7, wherein, the first capability setting comprises a scanning capability setting and a recognizing capability setting.

\* \* \* \* \*